(12) United States Patent
de Lescure et al.

(10) Patent No.: US 11,784,909 B2
(45) Date of Patent: Oct. 10, 2023

(54) QUALITY METRICS FOR OPTIMIZATION TASKS IN GENERATION OF A NETWORK

(71) Applicant: ARTERIS, INC., Campbell, CA (US)

(72) Inventors: Benoit de Lescure, Campbell, CA (US); Moez Cherif, Santa Cruz, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 18/157,058

(22) Filed: Jan. 19, 2023

(65) Prior Publication Data

US 2023/0155919 A1 May 18, 2023

Related U.S. Application Data

(62) Division of application No. 17/129,950, filed on Dec. 22, 2020, now Pat. No. 11,601,357.

(51) Int. Cl.
*G06F 15/173* (2006.01)
*H04L 45/12* (2022.01)
(Continued)

(52) U.S. Cl.
CPC .............. *H04L 45/12* (2013.01); *H04L 45/02* (2013.01); *H04L 45/302* (2013.01); *H04L 45/42* (2013.01)

(58) Field of Classification Search
CPC ....... H04L 45/12; H04L 45/302; H04L 45/02; H04L 45/42
(Continued)

(56) References Cited

U.S. PATENT DOCUMENTS 5,485,396 A   1/1996   Brasen et al.
5,541,849 A   7/1996   Rostoker et al.
(Continued)

FOREIGN PATENT DOCUMENTS

CN    105187313 B    5/2018
CN    109587081 A    4/2019
(Continued)

OTHER PUBLICATIONS

Anonymous "Network on a chip—Wikipedia", Jun. 15, 2021, https://en.wikipedia.org/w/index.php?title=Network_on_a_chip &oldid=1028654828.
(Continued)

*Primary Examiner* — Lan Dai T Truong
(74) *Attorney, Agent, or Firm* — DANA LEGAL SERVICES; Jubin Dana

(57) ABSTRACT

Qualifying networks properties that can be used for topology generation of networks, such as a network-on-chip (NoC). In accordance with various embodiments and different aspects of the invention, quality metrics are generated, analyzed, and used to determine a quantitative quality set of values for a given generated solution for a network. The method disclosed allows the network designer or an automated network generation process to determine if the results produced are a good, an average or a bad solution. The advantage of the invention includes simplification of design process and the work of the designer by using quality metrics. Various quality metrics are generated using network definitions. These quality metrics provide quality evaluation and the quality assessment of the optimization process for a generated (optimized) network. The quality metrics include analyzing latency through a network and analyzing total wire length used by the network.

7 Claims, 11 Drawing Sheets

(51) Int. Cl.
*H04L 45/02* (2022.01)
*H04L 45/302* (2022.01)
*H04L 45/42* (2022.01)

(58) Field of Classification Search
USPC .......................................................... 709/238
See application file for complete search history.

(56) References Cited

U.S. PATENT DOCUMENTS

| | | |
|---|---|---|
| 5,623,420 A | 4/1997 | Fee et al. |
| 5,638,288 A | 6/1997 | Deeley |
| 5,761,078 A | 6/1998 | Fuller et al. |
| 5,903,886 A | 5/1999 | Heimlich et al. |
| 5,983,277 A | 11/1999 | Heile et al. |
| 6,002,857 A | 12/1999 | Ramachandran |
| 6,134,705 A | 10/2000 | Pedersen et al. |
| 6,145,117 A | 11/2000 | Eng |
| 6,249,902 B1 | 6/2001 | Igusa et al. |
| 6,321,363 B1 | 11/2001 | Huang et al. |
| 6,360,356 B1 | 3/2002 | Eng |
| 6,378,121 B2 | 4/2002 | Hiraga |
| 6,437,804 B1 | 8/2002 | Ibe et al. |
| 6,449,761 B1 | 9/2002 | Greidinger et al. |
| 6,622,225 B1 | 9/2003 | Kessler et al. |
| 6,883,455 B2 | 4/2005 | Maeda et al. |
| 6,907,591 B1 | 6/2005 | Teig et al. |
| 7,096,436 B2 | 8/2006 | Bednar et al. |
| 7,398,497 B2 | 7/2008 | Sato et al. |
| 7,587,687 B2 | 9/2009 | Watanabe et al. |
| 7,788,625 B1 | 8/2010 | Donlin et al. |
| 8,042,087 B2 | 10/2011 | Murali et al. |
| 8,302,041 B1 | 10/2012 | Chan et al. |
| 8,819,611 B2 | 8/2014 | Philip et al. |
| 9,184,998 B2 | 11/2015 | Xue |
| 9,262,359 B1 | 2/2016 | Noice et al. |
| 9,444,702 B1 | 9/2016 | Raponi et al. |
| 9,569,574 B1 | 2/2017 | Khan et al. |
| 9,792,397 B1 | 10/2017 | Nagaraja |
| 9,825,779 B2 | 11/2017 | Ruymbeke et al. |
| 9,940,423 B2 | 4/2018 | Lescure |
| 10,068,047 B1 | 9/2018 | Finn |
| 10,282,502 B1 | 5/2019 | BShara et al. |
| 10,348,563 B2 | 7/2019 | Rao et al. |
| 10,460,062 B2 | 10/2019 | Feld et al. |
| 10,733,350 B1 | 8/2020 | Prasad et al. |
| 10,922,471 B2 | 2/2021 | Baeckler et al. |
| 10,990,724 B1 | 4/2021 | Cherif et al. |
| 11,121,933 B2 | 9/2021 | Cherif et al. |
| 11,281,827 B1 | 3/2022 | Labib et al. |
| 11,449,655 B2 | 9/2022 | Cherif et al. |
| 2003/0093765 A1 | 5/2003 | Lam et al. |
| 2004/0040007 A1 | 2/2004 | Harn |
| 2004/0230919 A1 | 11/2004 | Balasubramanian et al. |
| 2005/0073316 A1 | 4/2005 | Graham |
| 2005/0268258 A1 | 12/2005 | Decker |
| 2007/0156378 A1 | 7/2007 | McNamara |
| 2007/0157131 A1 | 7/2007 | Watanabe et al. |
| 2007/0174795 A1 | 7/2007 | Lavagno et al. |
| 2007/0186018 A1 | 8/2007 | Radulescu et al. |
| 2008/0046854 A1 | 2/2008 | Tang |
| 2008/0049753 A1 | 2/2008 | Heinze et al. |
| 2008/0279183 A1 | 11/2008 | Wiley et al. |
| 2008/0291826 A1 | 11/2008 | Licardie et al. |
| 2009/0031277 A1 | 1/2009 | Mcelvain et al. |
| 2009/0313592 A1 | 12/2009 | Murali et al. |
| 2010/0061352 A1 | 3/2010 | Fasolo et al. |
| 2010/0162189 A1 | 6/2010 | Lavagno et al. |
| 2010/0218146 A1 | 8/2010 | Platzker et al. |
| 2010/0274785 A1 | 10/2010 | Procopiuc et al. |
| 2011/0170406 A1 | 7/2011 | Krishnaswamy |
| 2012/0013509 A1 | 1/2012 | Wisherd et al. |
| 2012/0311512 A1 | 12/2012 | Michel et al. |
| 2013/0174113 A1 | 7/2013 | Lecler et al. |
| 2013/0258847 A1 | 10/2013 | Zhang et al. |
| 2013/0283226 A1 | 10/2013 | Ho et al. |
| 2014/0115218 A1 | 4/2014 | Philip et al. |
| 2014/0126572 A1 | 5/2014 | Hutton et al. |
| 2014/0153575 A1 | 6/2014 | Munoz |
| 2014/0156826 A1* | 6/2014 | Chang ..................... H04L 45/02 709/224 |
| 2014/0160939 A1 | 6/2014 | Arad et al. |
| 2014/0169173 A1 | 6/2014 | Naouri et al. |
| 2014/0204735 A1 | 7/2014 | Kumar et al. |
| 2014/0211622 A1 | 7/2014 | Kumar et al. |
| 2014/0298281 A1 | 10/2014 | Varadarajan et al. |
| 2015/0036536 A1 | 2/2015 | Kumar et al. |
| 2015/0106778 A1 | 4/2015 | Mangano et al. |
| 2015/0178435 A1 | 6/2015 | Kumar |
| 2015/0254325 A1 | 9/2015 | Stringham |
| 2015/0341224 A1 | 11/2015 | Van et al. |
| 2015/0347641 A1 | 12/2015 | Gristede et al. |
| 2016/0103943 A1 | 4/2016 | Xia et al. |
| 2016/0275213 A1 | 9/2016 | Tomita |
| 2017/0060204 A1 | 3/2017 | Gangwar et al. |
| 2017/0063734 A1 | 3/2017 | Kumar |
| 2017/0132350 A1 | 5/2017 | Janac |
| 2017/0177778 A1 | 6/2017 | Lescure |
| 2017/0193136 A1 | 7/2017 | Prasad et al. |
| 2018/0115487 A1 | 4/2018 | Thubert et al. |
| 2018/0144071 A1 | 5/2018 | Yu et al. |
| 2018/0227180 A1 | 8/2018 | Rao et al. |
| 2019/0073440 A1 | 3/2019 | Farbiz et al. |
| 2019/0205493 A1 | 7/2019 | Garibay et al. |
| 2019/0246989 A1 | 8/2019 | Genov et al. |
| 2019/0251227 A1 | 8/2019 | Fink |
| 2019/0260504 A1 | 8/2019 | Philip et al. |
| 2019/0363789 A1 | 11/2019 | Lee et al. |
| 2020/0092230 A1 | 3/2020 | Schultz et al. |
| 2020/0162335 A1 | 5/2020 | Chen et al. |
| 2020/0234582 A1 | 7/2020 | Mintz |
| 2020/0366607 A1 | 11/2020 | Kommula et al. |
| 2021/0203557 A1 | 7/2021 | Cherif et al. |
| 2021/0226887 A1* | 7/2021 | Mereddy ............. H04L 47/2441 |
| 2021/0320869 A1 | 10/2021 | Bourai et al. |
| 2021/0409284 A1 | 12/2021 | Cherif et al. |
| 2022/0294704 A1 | 9/2022 | Lescure et al. |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 A1 | 6/2021 |
| EP | 4024262 A1 | 7/2022 |
| EP | 4057179 A1 | 9/2022 |

OTHER PUBLICATIONS

Haytham Elmiligi et al: "Networks-on-chip topology optimization subject to power, delay, and reliability constraints", IEEE International Symposium on Circuits and Systems. May 30, 2010, pp. 2354-2357, DOI: 10.1109/ISCAS.2010.5537194.

Jain R. et al: "Predicting system-level area and delay for pipelined and nonpipelined designs" IEEE Transactions on Computer Aided Design of Integrated Circuits and Systems, vol. 11, No. 8, Jan. 1, 1992, pp. 955-965, DOI: 10.1109/43.149767.

Jingye Xu et al: "Latch Based Interconnect Pipelining For High Speed Integrated Circuits", Proceedings of The International Conference on Electro/Information Technology, May 1, 2006, pp. 295-300, DOI: 10.1109/EIT.2006.252152.

Jun Minje et al: "Exploiting Implementation Diversity and Partial Connection of Routers in Application-Specific Network-on-Chip Topology Synthesis" IEEE Transactions on Computers, IEEE, USA, vol 63, No. 6, Jun. 1, 2014 (Jun. 1, 2014), pp. 1434-1445, XP011550397, ISSN: 0018-9340. DOI: 10.1109/TC.2012.294.

Saponara S et al: "Design and coverage-driven verification of a novel network-interface IP macrocell for network-on-chip interconnects", Microprocessors and Microsystems, vol. 35, No. 6, pp. 579-592, XP028255708, ISSN: 0141-9331, DOI: 10.1016/J.MICPRO.2011.06.005.

(56) References Cited

OTHER PUBLICATIONS

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331, DOI: 10.1016/J.MICPRO. 2016.04.008.
Song Z et al: "A NoC-Based High Performance Deadlock Avoidance Routing Algorithm", Computer and Computational Sciences, 2008, IMSCCS '08. International Multisymposiums on, IEEE, Piscataway, NJ, USA, Oct. 18, 2008, pp. 140-143, XP031411025, ISBN: 978-0-7695-3430-5.
U.S. Appl. No. 17/134,384, filed Dec. 26, 2020, Federico Angiolini.
U.S. Appl. No. 17/665,578, filed Feb. 6, 2022, K. Charles Janac.
"a distributed interleaving scheme for efficient access to wideIO dram memory", Seiculescu Ciprian, Benini Luca, De Micheli Giovanni, CODES+ISSS'12 (Year: 2012).
"Thread-Fair Memory Request Reordering"; Kun Fang, Nick Iliev, Ehsan Noohi, Suyu Zhang, and Zhichun Zhu; Dept of ECE, Univeristy of Illinois at Chicago; JWAC-3 Jun. 9, 2012.
19th Asia and South Pacific Design Automation Conference Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.
ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.
Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.
Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.
David Atienza et al, Network-on-Chip Design and Synthesis Outlook, Science Direct, Integration the VLSI, journal 41 (2008) 340-359.
Dumitriu vet al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 *abstract* * p. 426-p. 429 *.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.
K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).
Luca Benini: "Application specific Noc design", Design, Automation and Test in Europe, 2006, Date '06: Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.
Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.
Partha et al., Design, Synthesis, and Test of Networks on Chips, IEEE (Year: 2005).
Picornell Tomas Tompic@gap.upv.es et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Srinivasan K et al, "Linear programming based techniques for synthesis of network-on-chip architectures", Computer Design: VLSI in Computers and Processors, 2004. ICCD 2004. Pr oceedings. IEEE International Conference on San Jose, CA, USA Oct. 11-13, 2004, Piscataway, NJ, USA,IEEE, (Oct. 11, 2004), doi: 10.1109/ICCD.2004.1347957, ISBN 978-0-7695-2231-9, pp. 422-429, XP010736641.
Srinivasan Murali et al: "Mapping and physical planning of networks-on-chip architectures with quality-of-service guarantees", Proceedings of The 2005 Asia and South Pacific Design Automation Conference, Jan. 18, 2005, DOI: 10.1145/1120725.1120737.
Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.
Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

* cited by examiner

QUALITY METRICS FOR OPTIMIZATION TASKS IN GENERATION OF A NETWORK

CROSS REFERENCE TO RELATED APPLICATIONS

The present application is a divisional of and claims benefit to U.S. Non-provisional application Ser. No. 17/129,950 filed on Dec. 22, 2020 by Moez CHERIF et al. and titled SYSTEM AND METHOD FOR GENERATION OF QUALITY METRICS FOR OPTIMIZATION TASKS IN TOPOLOGY SYNTHESIS OF A NETWORK, the entire disclosure of which is incorporated herein by reference.

TECHNICAL FIELD

The invention is in the field of network design and, more specifically, related to generating and using quality metrics in topology synthesis of a network-on-chip (NoC).

BACKGROUND

Multiprocessor systems have been implemented in systems-on-chips (SoCs) that communicate through network-on-chips (NoCs). The SoCs include instances of master (initiators) intellectual properties (IPs) and slave (targets) IPs. Transactions, in the form of packets, are sent from a master to one or more slaves using industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

For a given set of performance requirements, such as connectivity and latency between source and destination, frequency of the various elements, maximum area available for the NoC logic, minimum throughput between sources and destinations, position on the floorplan of elements attached to the NoC, it is a complex task to create an optimal NoC that fulfills all the requirements with a minimum amount of logic and wires. This is typically the job of the chip architect or chip designer to create this optimal NoC, and this is a difficult and time-consuming task. In addition to this being a difficult task, the design of the NoC is revised every time one of the requirement changes, such as modifications of the chip floorplan or modification of the expected performance. As a result, this task needs to be redone frequently over the design time of the chip. This process is time consuming, which results in production delays.

As indicated, it is a complex task to create an optimal NoC that fulfills all the requirements in term of performance and a minimized the amount of logic and wires used. This is a difficult and time-consuming task. Also, the design of the NoC is revised every time one of the requirements changes. As a result, optimization of the NoC is redone frequently over the design time. Various processes are contemplated to automatically create a NoC, when given a set of constraints. Regardless of the process used to create automatically a NoC, the results produced by the automated process need to be assessed to determine the quality of the result or output. Therefore, what is needed is a system and method to analyze a NoC and produces quality metrics for a given generated solution for the NoC.

SUMMARY

In accordance with various embodiments and aspects of the invention, systems and methods are disclosed that analyze a network-on-chip (NoC) and produce quality metrics for a given generated solution for the NoC. The system and method disclosed include a process that implements optimization strategies to maximize the quality of the result, which allows the designer to understand if the result produced is a good, an average or a bad solution. The advantage of the invention includes simplification of the design process and the work of the designer by using quality metrics generated for the network. Various quality metrics are determined. These quality metrics provide an approach for quality evaluation. The quality metrics can determine the quality of the optimization of a generated network. The quality metrics include analyzing paths and edges in the network.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1A:
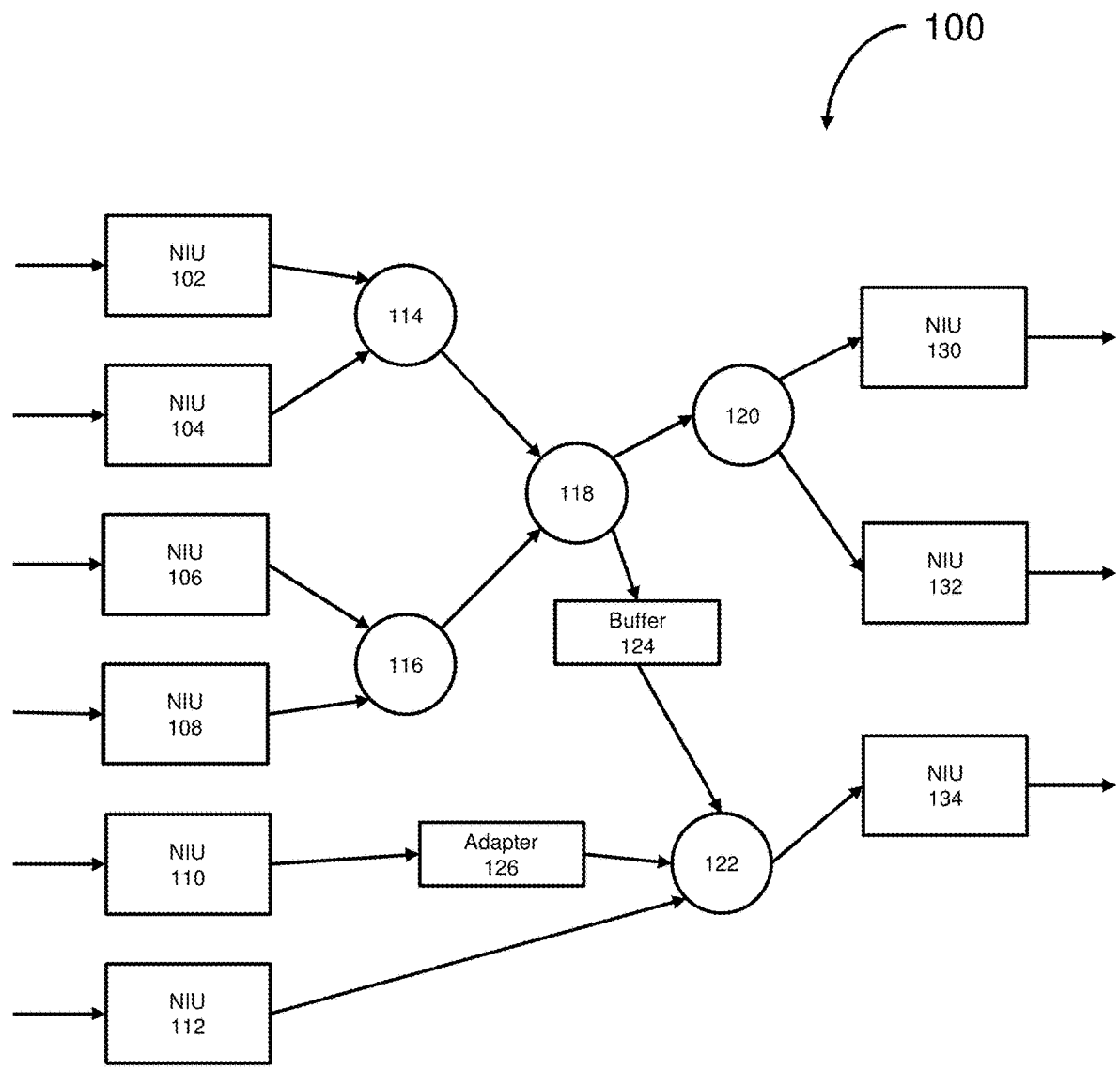
FIG. 1A shows a logic view of a network-on-chip (NoC) that includes various elements that create the NoC.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of the structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, a "source, a "master," and an "initiator" refer to intellectual property (IP) blocks, units, or modules. The terms "source," "master," and "initiator" are used interchangeably within the scope and embodiments of the invention. As used herein, a "sink," a "destination," a "slave," and a "target" refer to IP blocks; the terms are used interchangeably within the scope and embodiments of the invention. As used herein, a "transaction" is either a request transaction or a response transaction. Examples of request transactions include write request and read request.

Transactions travel from source to destination using a route or communication path that passes through a Network-on-Chip (NoC), which includes various links and switches (a type of node). The terms "path" and "route" are used interchangeable herein. Paths includes and are made up of any combination of nodes and edges (also referred to herein as links), along which data travels form source to destination. In accordance with the various aspects and embodiments of the invention, performing edge clustering minimizes long edges. Many long edges traversing a narrow corridor between 2 or more forbidden regions (blocked areas), which leads to wire congestion. Minimizing the wiring of long edges contributes to lowering congestion. In accordance with the various aspects and embodiments of the invention, the length of an edge (link) is measured as the length of the routed wires between the edge's end points.

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Referring now to FIG. 1A, a network-on-chip (NoC) 100 is shown in accordance with various aspects and embodiments of the invention. NoCs are a special type of network (or interconnect) that are used to handle communication between units of a system on chip (SoC). As discussed below, switches route flows of traffic between sources and destinations and perform arbitration. Adapters deal with various conversions between data width, clock, and power domains. Buffers are used to insert pipelining elements to span long distances, or to store packets to deal with rate adaptation between fast senders and slow receivers or vice-versa. The number and precise functions of each network elements depend on the network on chip technology employed. The NoC elements are implemented on a chip as logic functions using digital logic.

The NoC 100 is one example of a network. In accordance with various aspects and embodiments of the invention, a network includes a set of nodes and set of edges, each of these has a model and can be used at the heart of the topology synthesis process to perform and implement transformation over the network and converge to the best solution fitting the specified requirements. The NoC 100 includes nodes and endpoints and uses elementary network functions that are assembled, such as: network interface units (NIUs) 102,104,106,108, 110, 112, 130, 132, and 134; nodes/switches 114, 116, 118,120, and 122; buffers, such as buffer 124; and adapters, such as adapter 126. The NoC's elementary functions (which are represented by components that implement the functions) use an internal NoC transport protocol to communicate with each other, based on the transmission of packets. NIUs convert the protocol used by the attached SoC unit (IP bloc), into the transport protocol used inside the NoC. The NoC elementary network functions use an internal transport protocol, which is specific to the NoC 100, to communicate with each other, typically based on the transmission of packets. The NIUs convert the protocol used by the attached system-on-chip (SoC) unit (not shown), into the transport protocol used inside the NoC 100. The switches route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock and power domains.

Figure 1B:
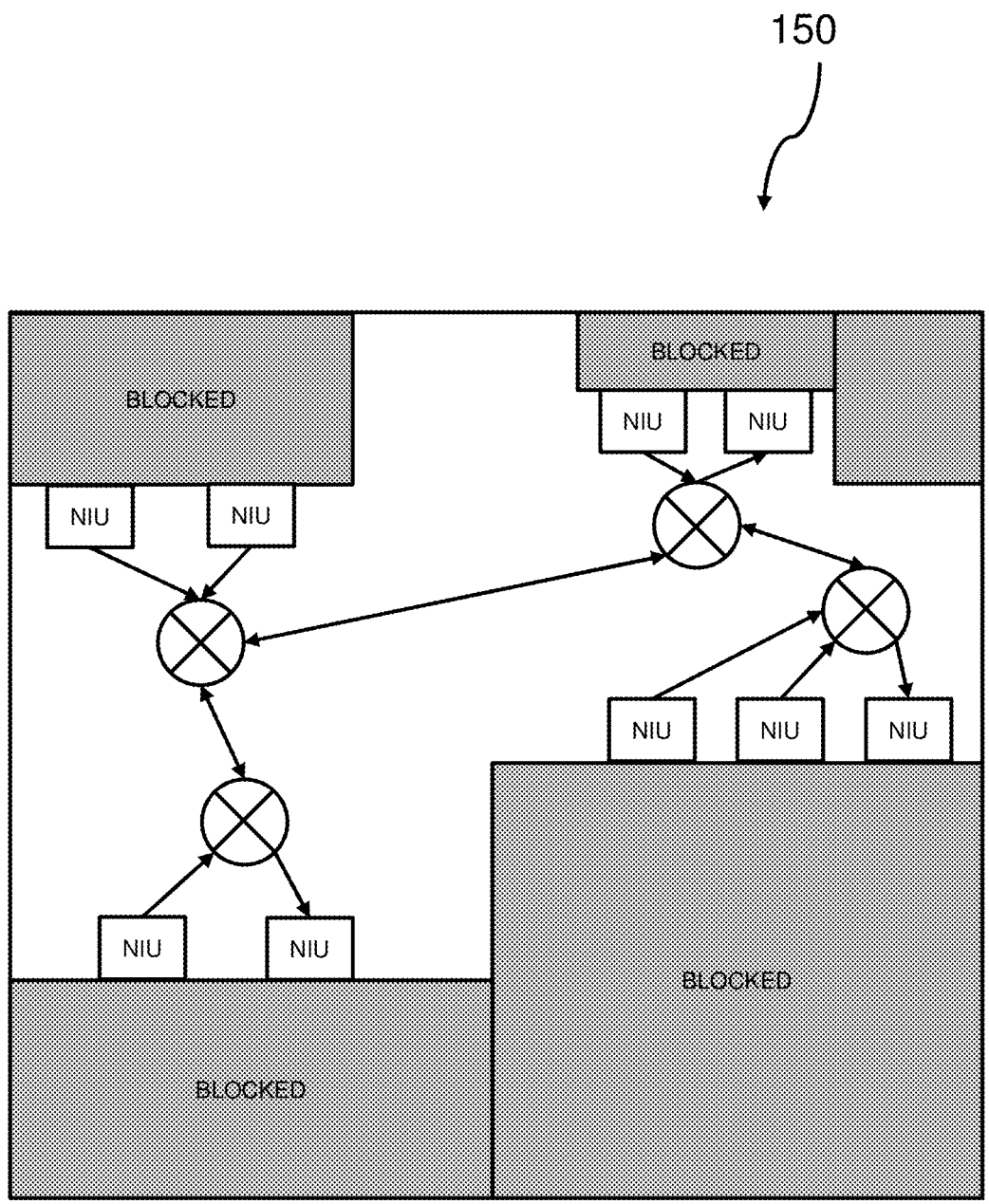
FIG. 1B shows a NoC including elements placed on a floorplan of a network.
Figure 2:
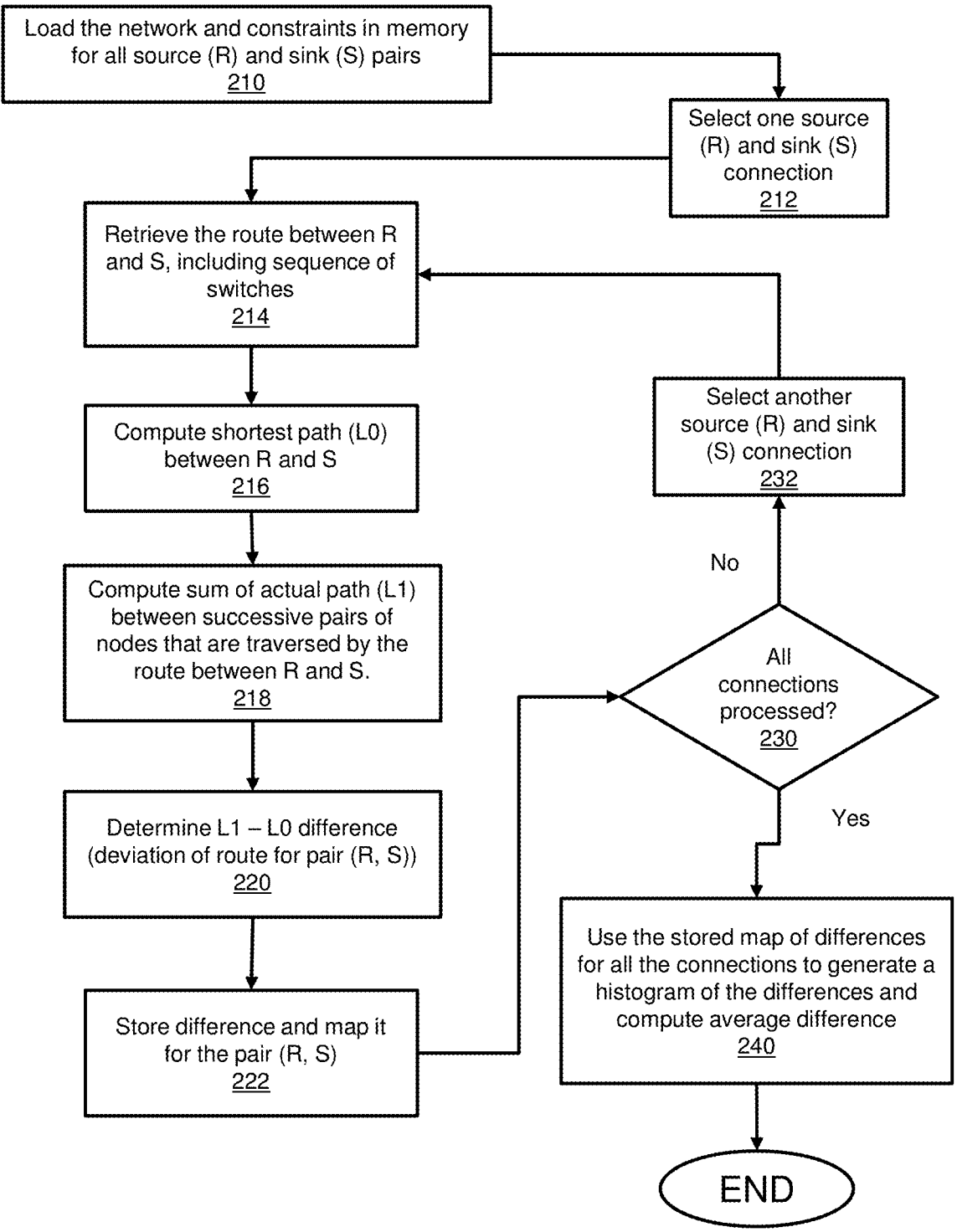
FIG. 2 shows a process for determining actual vs optimal distances between a source (R) and sink (S) pair of endpoints in accordance with the aspects and embodiments of the invention.

Referring now to FIG. 1B, a NoC 150 is shown with various elements, such as NIUs, switches, and blockage areas in the floorplan. The NoC 150 includes various connectivity elements through various switches. In accordance with one aspect of the invention, a set of constraints are used as input to the tool, which is discussed in greater detail below. In accordance with some aspects of the invention, the tool executes a set of sub-steps and produces the description (topology synthesis) of a resulting NoC, such as the NoC 150, with its configured elements and the position of each element on the floorplan. The generated description is used to actually implement the NoC hardware, using the physical information produced to provide guidance to the back-end implementation flow Referring now to FIG. 2, disclosed is a process for determining one NoC quality metric (quantitative network quality metric) in accordance with the various aspects and embodiments of the invention. At step 210, a network description and constraints for the network, such as a NoC, is loaded in memory. The description of the NoC can be loaded from any source, such as a disk or transmitted from a remote location. The format encoding the data can be any format and the scope of the invention is not limited thereby. At step 212, the process selects one source and sink pair (R, S). At step 214, the route information between (R, S) is retrieved for analysis. The route information includes the sequence of switches through which the route travels. At step 216, the shorted path (or wire length) for an optimal path is determine or computed. The length of the shortest path for the pair (R, S) is identified as L0. At step 218, the actual path or wire length for the pair (R, S) is computed when traveling from the source to the destination or sink through the NoC. This is determined by adding all the successive paths along the route between successive nodes that the route traverses. The total actual wire length or path length is determined and is identified as L1. This is discussed in greater detail with respect to FIG. 3A and FIG. 3B.

Thus, for each source (connected to the example network, a NoC) in communication with a destination, a minimum distance (shortest path) is computed. In accordance with one aspect of the invention, the minimum distance algorithm, which determines the distance from the source to the destination, considers blocked areas of the floorplan that cannot have logic and wires. The minimum distance algorithm can use of any of the well-known routing algorithms such as Djikstra, A*, etc. and the scope of the invention is not limited thereby. Once a minimum distance is determined, this is used as a reference.

In accordance with some aspects and embodiments of the invention, L0 and L1 are stored in memory. At step 220, the difference between the actual path (L1) and the ideal path (L0) is determined to produce the deviation for the route of the pair (R, S). The deviation is stored in memory and mapped for the pair (R, S). At step 230, the process determined if all possible pairs (R, S) have been processed. If not, the at step 232, another pair ($R_1$, $S_1$) is selected and the process returns to step 214. This repeated until all pairs ($R_n$, $S_n$) have been processed. State another way, the path length taken (through the NoC) to go from the source to the destination is calculated. Also, the minimum distance for the same pair of (source, destination) points is calculated. The length of the actual path taken and the length of the minimum distance are compared to determine a difference for the pair of (source, destination) points. This difference represents the difference path measurement. This is performed for all the pairs (source, destination) and a set of differences is produced. Once all pairs have been processed, as determined at step 230, then at step 240 the process uses all the stored difference for all the pairs ($R_n$, $S_n$) to generate a histogram presentation of the computed differences and to compute an average difference value.

In accordance with one aspect of the invention, this set of differences is used to generate a report using an average difference. In addition and in accordance with various aspects and embodiments of the invention, this set of differences can be reported as a list of differences shown as a sorted list or as a histogram. The result of the differences is also used to generate an average of the differences. This produces one type of quality metric.

The quality metric is a representation of an average of the differences between theoretical minimum distance on the floorplan and actual distances taken by the signal traveling from source to destination through the NoC or the network. The quality metric is an indication of how good (or how bad) the latencies will be through the NoC. The latency through the NoC measures how long it takes for a message to traverse or cross the NoC from source to destination. Latency is impacting the performance of components attached to the NoC, such as a CPU. Therefore, the smaller the difference between the actual and minimum distance, the better the performance of the NoC; state another way, the lower the latency.

Figure 3A:
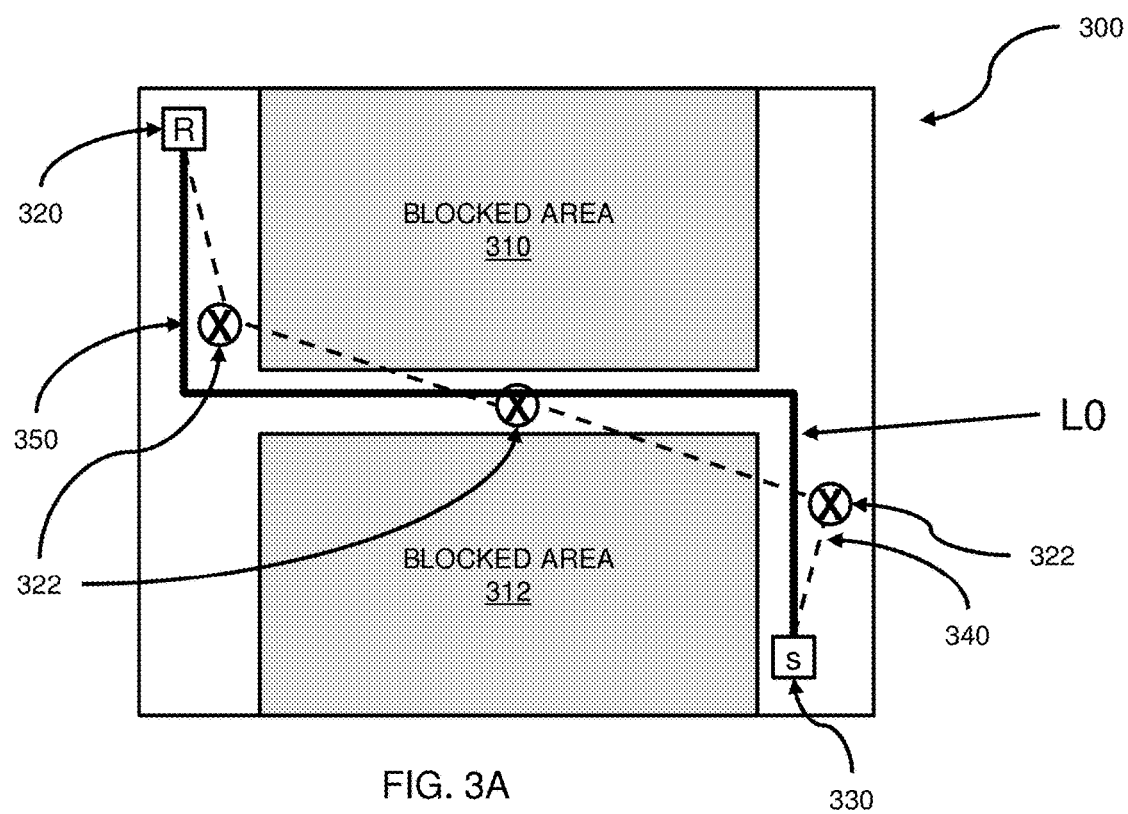
FIG. 3A shows a block diagram of a floorplan with a fly path and the shortest path in accordance with the aspects and embodiments of the invention.
Figure 3B:
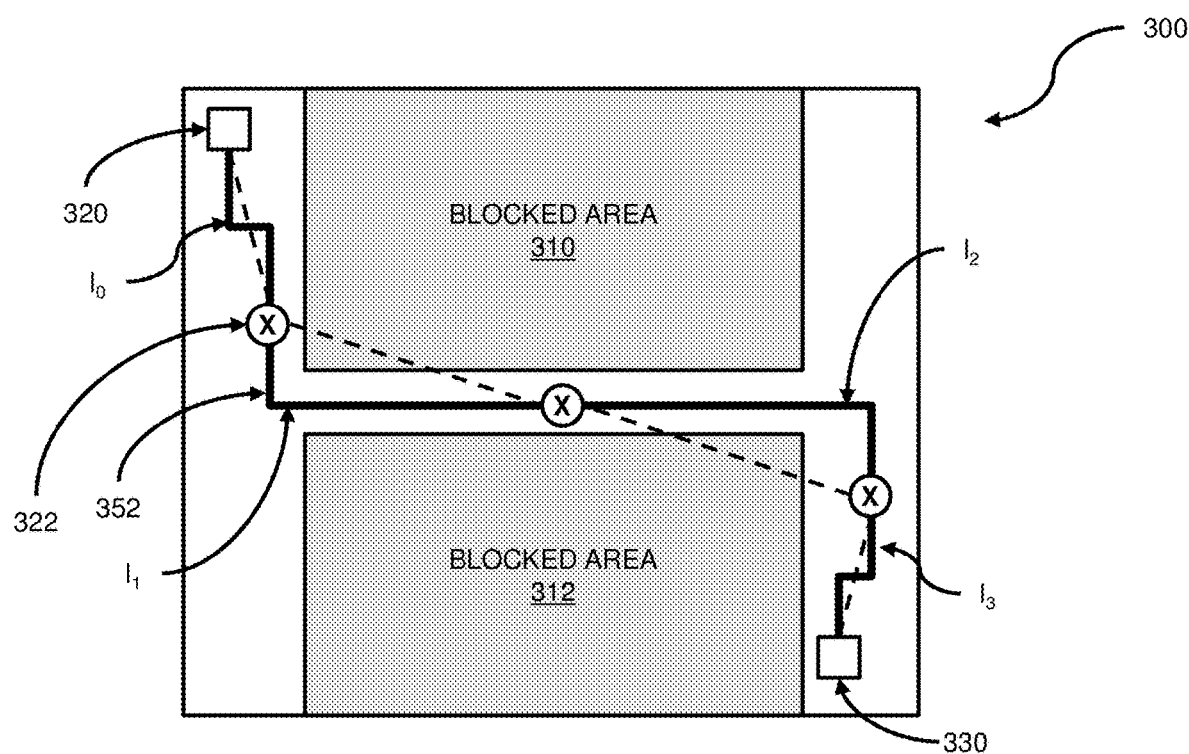
FIG. 3B shows a block diagram of a floorplan with an actual path and a fly path in accordance with the aspects and embodiments of the invention.

Referring now to FIG. 3A and FIG. 3B, in accordance with one example of an aspect and embodiment of the invention, a network's floorplan 300 is shown with blocked areas 310, a source or initiator 320 (R) that communicates with a destination or target 330 (S) through a route that traverses switches 322 in the network or NoC. The route is represented by a fly path 340 (broken line). The fly path 340 is a visual representation of the connection between the initiator 320 and the target 300. The fly path 340 is represented by a minimum distance path 350. The minimum distance path 350 is compared to an actual path 352, and is determined by a minimum distance finding algorithm (A* in this non-limiting example). In accordance with some aspects and embodiments of the invention, the algorithm is a combination of such minimum distance algorithm and other heuristics, such as the ones used to create a roadmap.

In accordance with one aspect and embodiment of the invention, the actual path 352 includes four segments of length $l_0$, $l_1$, $l_2$, and $l_3$ that are connected via switches 322. The actual total paths length is L1, which is determined as follows:

$$L_1 = l_0 + l_1 + l_2 + l_3$$

The segments of length $l_0$, $l_1$, $l_2$, and $l_3$ are Manhattan paths, which are routed using vertical and horizontal segments. The difference between the length L1 (of the actual path 352) and the minimum distance path L0 (the minimum or optimal path 350) is the difference between the aggregated length of the segments of the actual paths and the aggregated lengths of the optimal network paths. The process uses these path length calculation in the process of FIG. 2.

Figure 4:
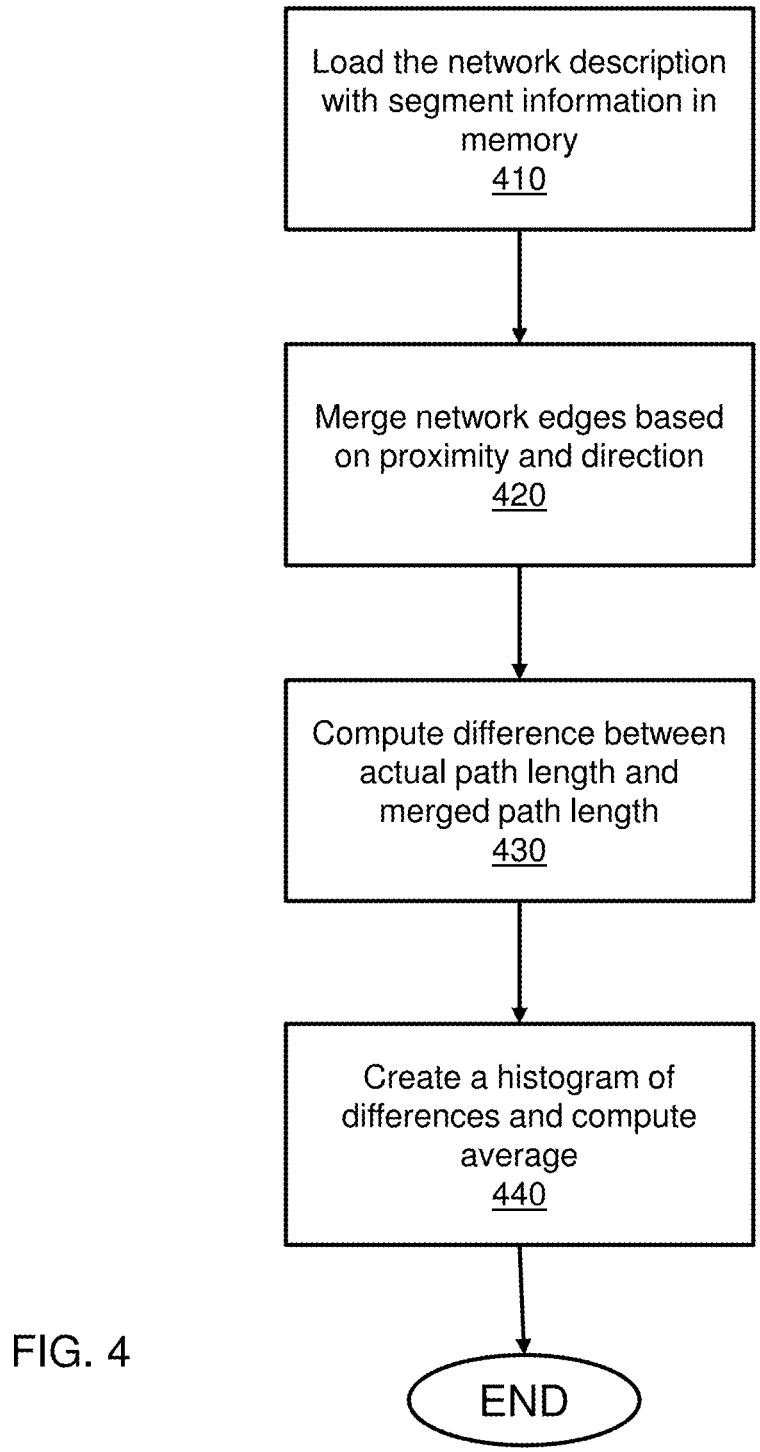
FIG. 4 shows a process for clustering or merging edges in a NoC in accordance with the various aspects and embodiments of the invention.

Referring now to FIG. 4, a process is show in accordance with the various aspects and embodiments of the invention for determining another NoC quality metric or quantitative network quality metric. At step 410, segments, also called edges, of the NoC or network are stored in memory with the NoC constraints. The format encoding the NoC description does not limit the scope of the invention. As indicated herein, at step 410 the sets of segments (for a pair of source, sink (R, S)) are stored in memory. The sets of stored segments are examined for clustering of the links or edges.

In accordance with one aspect and embodiment of the invention, at step 420 merging of edges (segments) or clustering of edges is performed. Edge clustering aims to minimize resources and enhancing performance goals through proper algorithms and techniques. In accordance with some aspects of the invention, edge clustering is applied in conjunction and in cooperation with node clustering. Edge clustering and node clustering can be used in combination by mixing, by being applied concurrently, or by being applied in sequence. The advantage and goal is to expand the spectrum of topology synthesis and span a larger solution space for the network.

The process of clustering uses proximity and direction of the flow of transported packets: when two segments (edges) are close enough in proximity, and are carrying packets in the same direction, one is removed and only the other is kept. If two segments S1 and S2 are close, in the same direction, and of very different length, the longest segment (e.g. S2) is split into two or three sub-segments (e.g. S2.1, S2.2, S2.3), so that one of the sub-segments (e.g. S2.2) is of the same length as the other segment (e.g. S1) to which the merge is to be attempted. Then clustering is attempted. The clustering is based on an assimilation scheme (merging) between sets of edges that are either horizontal or vertical, and transport packets in the same direction, for instance left to right, right to left, up to down or down to up.

In accordance with one embodiment and aspect of the invention, the clustering algorithm considers other requirements, such as performances or avoidance of deadlocks, to decide when to assimilate two segments and cluster the segments. The clustering algorithm attempts to pair as many segments as possible. The clustering mechanism continues until no more segments are left close to another.

At step 430, the difference between actual path length and merged path length is computed. The aggregated length of the set of segments, which is left after clustering, represent a "minimum" network in term of used wires; thus, it gives an idea of the amount of wires the NoC is using compared to a theoretical minimum. More wires result in more logic gates and more area needed. Hence, the closer to the minimum network used wires is to the theoretical minimum, the better the NoC is.

At step 440, the average difference (between actual network aggregated length and theoretical minimum network aggregated length) is computed and presented, in accordance with one aspect and embodiment of the invention. The information is used to generate a report based on an average difference. In addition and in accordance with various aspects and embodiments of the invention, this set of differences can be reported as a list of differences shown as a sorted list, or as a histogram. The result is an average of the differences that represents the quality metric based on wire length derived from merged edges.

Figure 5A:
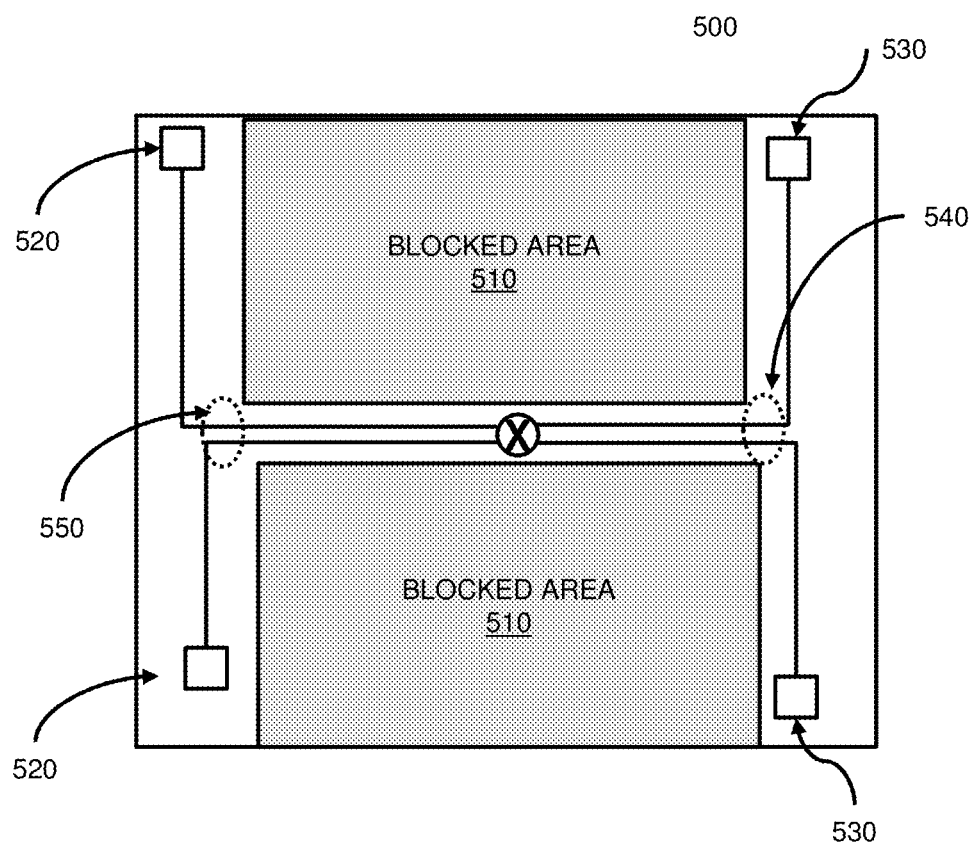
FIG. 5A shows a block diagram pre-clustering of edges in a NoC in accordance with various aspects and embodiments of the invention.
Figure 5B:
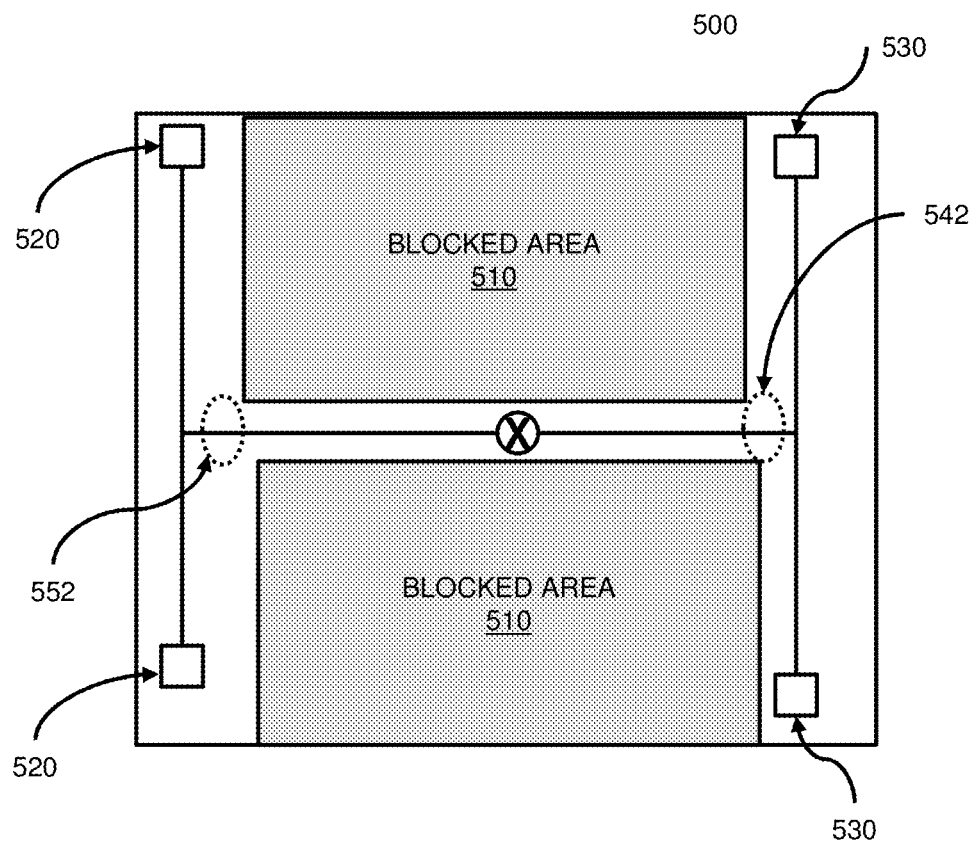
FIG. 5B shows a block diagram of clustered edges in a NoC in accordance with various aspects and embodiments of the invention.

Referring now to FIG. 5A and FIG. 5B, a block diagram of a floorplan 500 is shown for implementing the process of determining the quality metric in accordance with the various aspects and embodiments of the invention. The floorplan 500 includes blocked areas 510. Two sources 520 are in communication with two targets 530 using edges 550 and 540. The process merges edges 540 to produce edge 542. The process merges edges 550 to produce edge 552.

Figure 6:
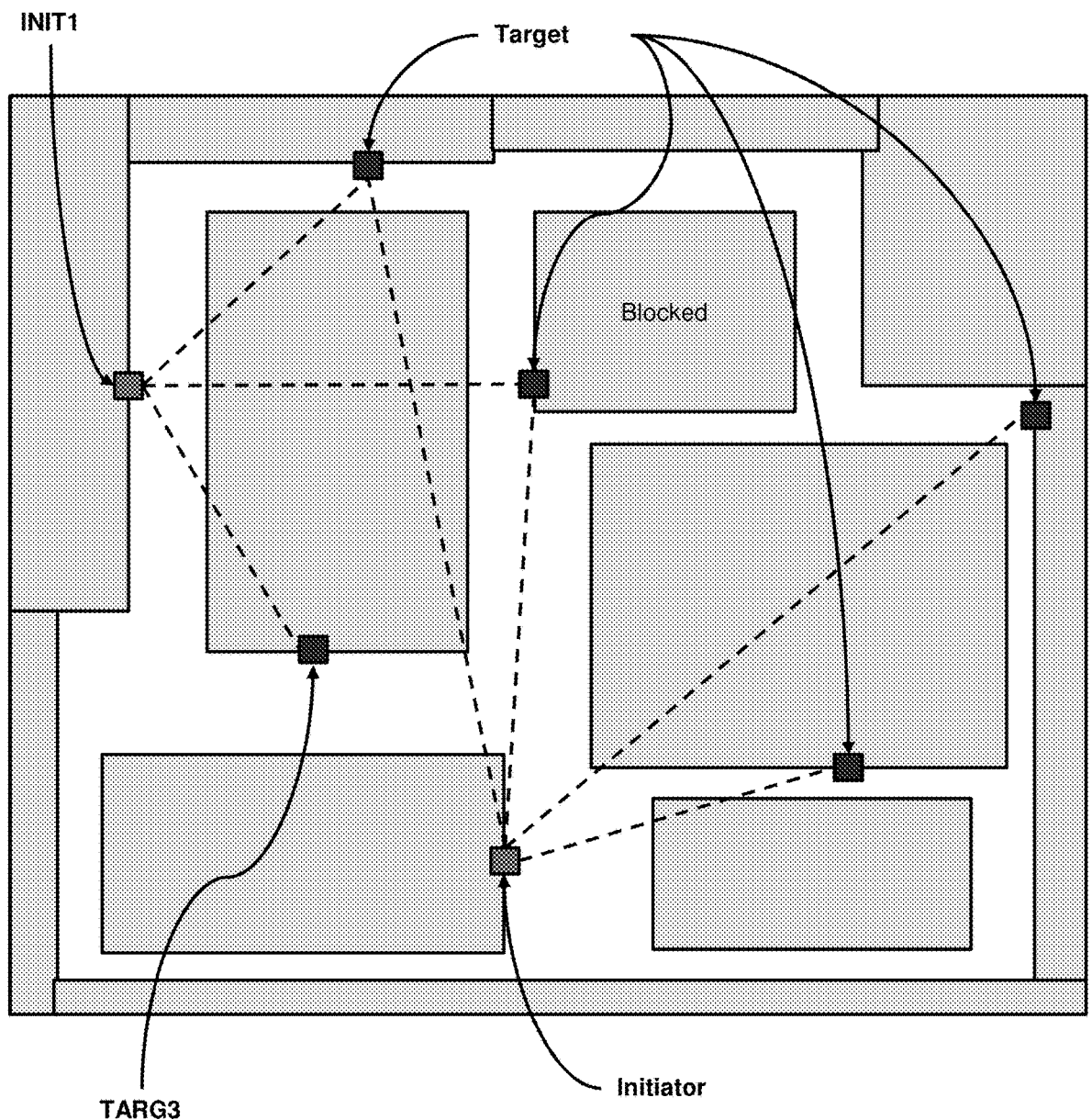
FIG. 6 shows a floorplan including connection mapping in accordance with the various aspects and embodiments of the invention.
Figure 7:
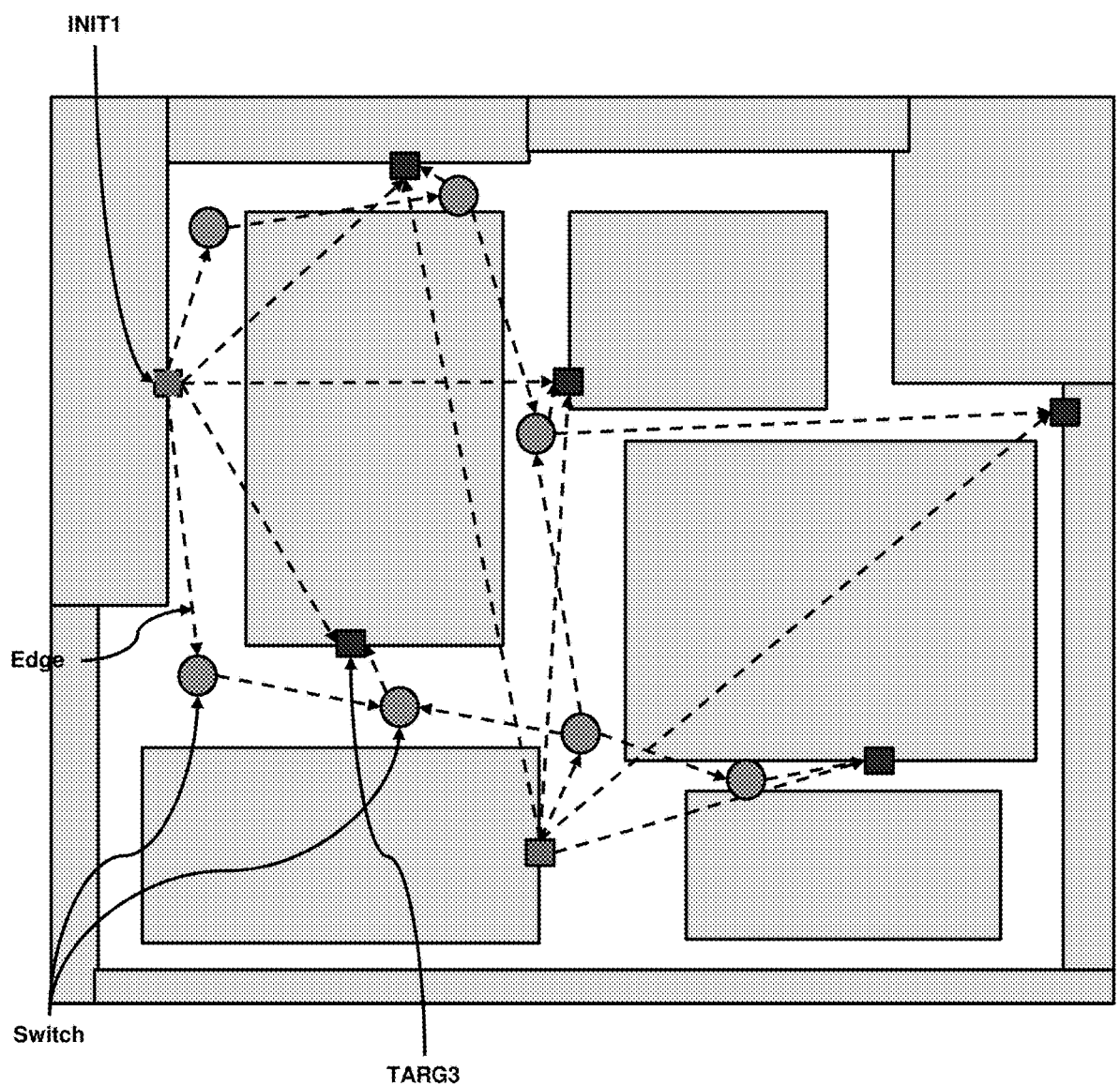
FIG. 7 shows the floorplan of FIG. 6 including logical edges and switches in accordance with the various aspects and embodiments of the invention.
Figure 8:
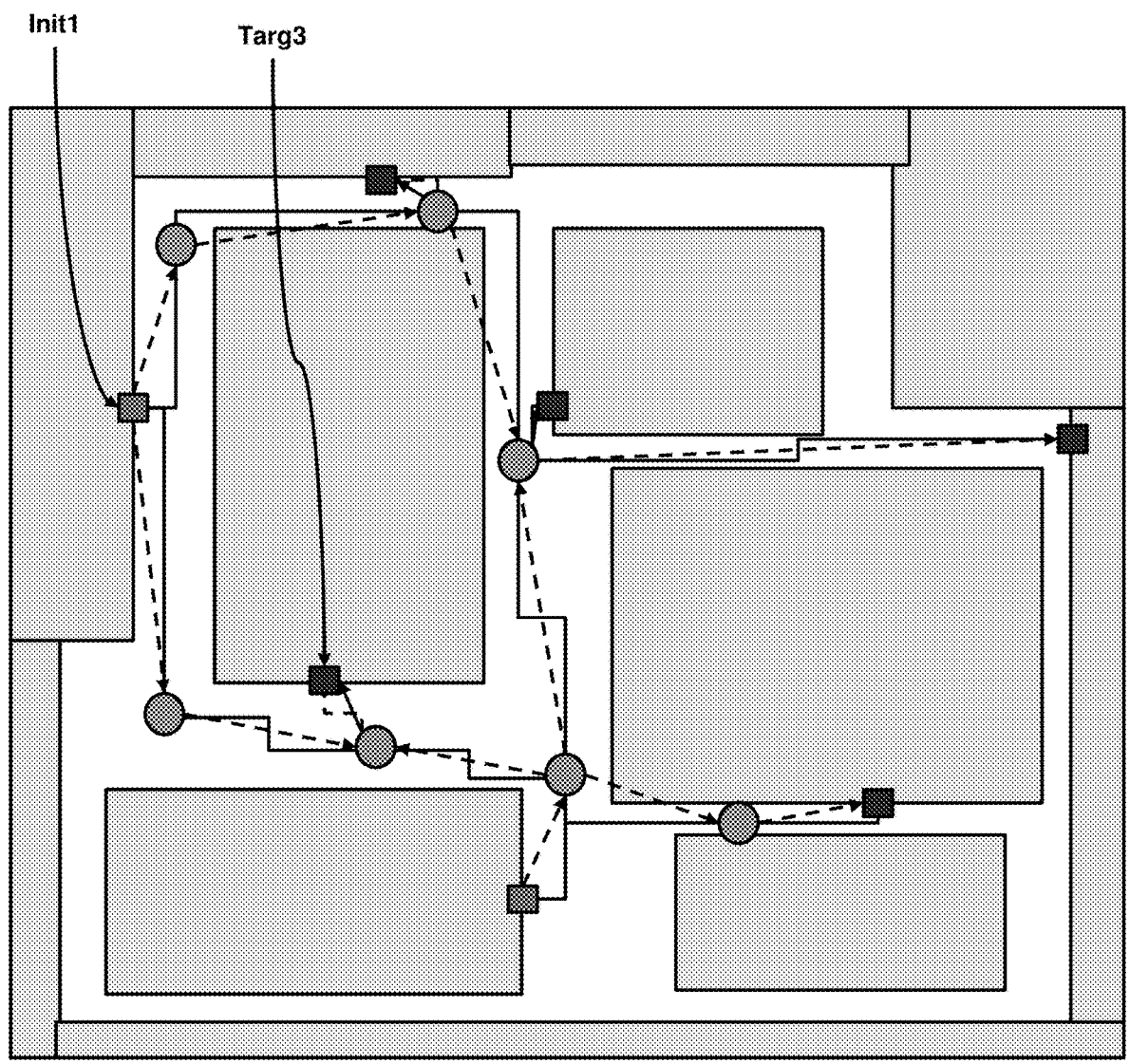
FIG. 8 shows the floorplan of FIG. 7 including segment paths in accordance with the various aspects and embodiments of the invention.
Figure 9:
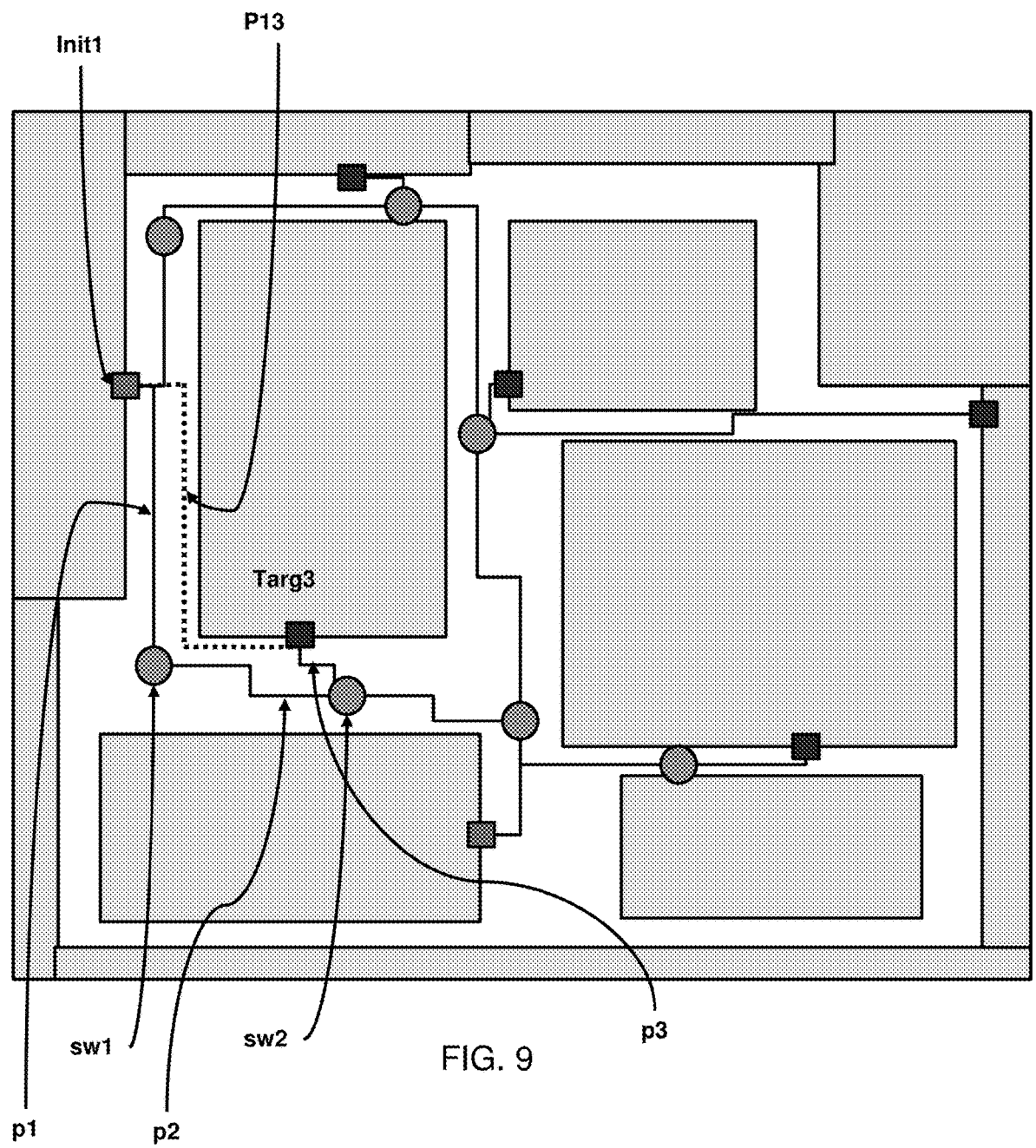
FIG. 9 shows the floorplan of FIG. 8 including an optimal path and an actual path in accordance with the various aspects and embodiments of the invention.

Referring now to FIG. 6 through FIG. 9, the process for merging or collapsing edges is shown in various stages and in accordance with the various aspects and embodiments of the invention. Initiators are in communication with multiple targets, as shown. The fly paths are shown in broken lines and not labelled for clarity. Looking specifically at an example of a route or communication path between one initiator (INIT1) and one target (TARG3), the connection map is shown in FIG. 6 using just fly paths or routes. FIG. 7 shows the logical edges (shown as fly paths with broken lines) of the network along with switches connecting the edges. As shown, INIT1 communicates with TARG3 using a direct fly path as one option. Also shown, INIT1 communicates with TARG3 using the logical route that traverses three segments connected by two switches. Any number of paths and switch are considered for connecting INIT1 and TARG3, all of which are within the scope of the various aspects and embodiments of the invention. FIG. 8 shows the detailed segments that represent the possible edges connecting INIT1 and TARG3. FIG. 9 shows optimal path P13 connecting INIT1 and TARG3. P13 represents the wirelength of the optimal collision-free path that directly connects INIT1 and TARG3. In addition to the optimal collision-free path, there is a route p1-p2-p3 from INIT1 to TARG3 that travels through switches sw1 and sw2. The route is the actual route through the NoC. The sum of the wirelength for the route p1-p2-p3 is the sum of the wirelengths of all the collision-free paths along the route from INIT1 to sw1 to sw2 to TARG3. The routes implement the connectivity. In accordance with the aspects of the invention, a route is an ordered list of network elements, one for each pair of (initiator, target) and one for each pair of (target, initiator). The route represents how traffic between the pairs will flow and through which elements.

Thus, the total wirelength from INIT1 to TARG3 is represent as follows:

$$WL(INIT1, TARG3) = WL(p1) + WL(p2) + WL(p3)$$

The total optimal WL from INIT1 to TARG3 is represented as follows:

$$\text{Optimal } WL = WL(P13)$$

In accordance with the various aspects and embodiments of the invention, the same process is applied to all the pairs of initiator-target that are represented by a connection in the connection map to determine the quality metric.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A method for computing a quantitative network quality metric using at least one total wire length quality metric, the method comprising:
   receiving, at a tool, a network information for the network that connects a plurality of initiators and a plurality of targets using a plurality of routes, wherein the network includes a plurality of edges, such that each initiator-target pair are connected by one or more edges of the plurality of edges along a route;
   determining an actual path length for each initiator-target pair based on the edges in a route, which connects the initiator to the target in each of the initiator target pair;
   merging the plurality of edges, each of which are part of a different route for different initiator-target pairs, that can be clustered based on proximity and direction to generate a plurality of merged edges making up a plurality of merged routes;
   determining a difference between each route of the plurality of routes and a corresponding merged route of the plurality of merged routes; and
   generating a visual representation of the differences, wherein the visual representation is the at least one total wire length quality metric of the network's design.

2. The method of claim 1, wherein the network information includes segment information.

3. The method of claim 1, wherein the network is a network-on-chip (NoC).

4. The method of claim 1, wherein the step of merging includes conditional clustering of any edges based on performance requirements.

5. The method of claim 1, wherein the step of merging includes avoiding clustering if a resulting merged route produces a deadlock.

6. The method of claim 1, wherein total wire length of all edges remaining in the plurality of merged edges is a minimum network total wire length.

7. A system including a non-transitory computer readable medium for storing code, such that when the code is executed by one or more processors to compute a quantitative network quality metric including at least one total wire length quality metric, the system is caused to:
   receive network information for a network that connects a plurality of initiators and a plurality of targets using a plurality of routes, wherein the network includes a plurality of edges, such that each initiator-target pair are connected by one or more edges of the plurality of edges along a route;
   determine an actual path length for each initiator-target pair based on the edges in a route, which connects the initiator to the target in each of the initiator target pair;
   merge the plurality of edges, each of which are part of a different route for different initiator-target pairs, that can be merged based on proximity and direction to generate a plurality of merged edges making up a plurality of merged routes;
   determine a difference between each route of the plurality of routes and a corresponding merged route of the plurality of merged routes; and
   generating a visual representation of the difference, wherein the visual representation is the at least one total wire length quality metric of the network's design.

* * * * *